(12) United States Patent
Combs

(10) Patent No.: US 10,809,725 B2
(45) Date of Patent: Oct. 20, 2020

(54) TROLLING MOTOR WITH LOCAL AND REMOTE CONTROL MODES

(71) Applicant: NAVICO HOLDING AS, Egersund (NO)

(72) Inventor: Neal Combs, Osteen, FL (US)

(73) Assignee: NAVICO HOLDING AS, Egersund (NO)

( * ) Notice: Subject to any disclaimer, the term of this patent is extended or adjusted under 35 U.S.C. 154(b) by 50 days.

(21) Appl. No.: 16/283,272

(22) Filed: Feb. 22, 2019

(65) Prior Publication Data
US 2020/0272152 A1    Aug. 27, 2020

(51) Int. Cl.
*B63H 20/00* (2006.01)
*B63H 20/32* (2006.01)
(Continued)

(52) U.S. Cl.
CPC ......... *G05D 1/0206* (2013.01); *B63H 20/007* (2013.01); *B63H 25/02* (2013.01); *B63H 2025/028* (2013.01)

(58) Field of Classification Search
CPC .................. B63H 20/007; B63H 20/12; B63H 2025/028; G05D 1/206
(Continued)

(56) References Cited

U.S. PATENT DOCUMENTS 3,598,947 A * 8/1971 Osborn .................. H01H 21/26
200/86.5
3,606,858 A * 9/1971 Edwards et al. ...... B63H 20/007
440/7

(Continued)

FOREIGN PATENT DOCUMENTS

WO    WO 2006/017511 A2    2/2006
WO    WO 2013/126761 A1    8/2013
WO    WO 2014/144471 A1    9/2014

OTHER PUBLICATIONS

Minn Kota Riptide Terrova Trolling Motor (4 pgs.) Website visited Feb. 21, 2019 https://minnkotamotors.johnsonoutdoors.com/saltwater-trolling-motorshiptide-terrova.
(Continued)

*Primary Examiner* — Albert K Wong
(74) *Attorney, Agent, or Firm* — Nelson Mullins Riley & Scarborough LLP

(57) ABSTRACT

A trolling motor system is provided including a wired or wireless controller and a trolling motor assembly configured for attachment to a watercraft. The trolling motor assembly includes a steering assembly configured to steer a trolling motor housing based on a steering command received from the wired or wireless controller in a remote mode, a handle configured to enable a user to steer the trolling motor housing in a local mode, a processor, and a memory including computer program code. The computer program code is configured to, when executed, cause the processor to receive one or more steering commands from the wired or wireless controller, cause the steering assembly to steer the trolling motor housing based on the one or more steering commands, receive an indication to enter the local mode, and disable the steering assembly in response to receiving the indication to enter the local mode.

20 Claims, 7 Drawing Sheets

(51) Int. Cl.
 *G05D 1/02* (2020.01)
 *B63H 25/02* (2006.01)
(58) Field of Classification Search
 USPC .......................................................... 701/2
 See application file for complete search history.

(56) References Cited

U.S. PATENT DOCUMENTS

| | | | | |
|---|---|---|---|---|
| 3,989,000 | A * | 11/1976 | Foley, Jr. ............. | B63H 20/007 |
| | | | | 440/6 |
| 4,820,208 | A * | 4/1989 | Phillips, Sr. ......... | B63H 20/007 |
| | | | | 440/62 |
| 5,355,821 | A * | 10/1994 | Johnson ............... | B63H 21/265 |
| | | | | 114/144 R |
| 5,540,606 | A * | 7/1996 | Strayhorn ............ | B63H 20/007 |
| | | | | 114/144 R |
| 6,213,821 | B1 * | 4/2001 | Bernloehr ............ | B63H 20/007 |
| | | | | 440/59 |
| 7,056,166 | B2 * | 6/2006 | Bernloehr ............ | B63H 20/007 |
| | | | | 114/144 R |
| 8,645,012 | B2 | 2/2014 | Salmon et al. | |
| 8,761,976 | B2 | 6/2014 | Salmon et al. | |
| 9,132,900 | B2 | 9/2015 | Salmon et al. | |
| 9,789,945 | B1 * | 10/2017 | Vaninetti ............... | B63H 20/12 |
| 9,836,048 | B1 * | 12/2017 | Widmaier ............ | B63H 20/007 |
| 9,840,312 | B1 | 12/2017 | Clark | |
| 2003/0194921 | A1 * | 10/2003 | Leiss .................... | B63H 20/007 |
| | | | | 440/6 |
| 2005/0020150 | A1 * | 1/2005 | Bernloehr ............ | B63H 20/007 |
| | | | | 440/58 |
| 2009/0037040 | A1 | 2/2009 | Salmon et al. | |
| 2010/0273367 | A1 | 10/2010 | Mynster | |
| 2011/0130055 | A1 * | 6/2011 | Huntt ................... | B63H 25/02 |
| | | | | 440/53 |
| 2014/0336854 | A1 | 11/2014 | Salmon et al. | |

OTHER PUBLICATIONS

Minn Kota Riptide SF 112 Bow-Mount Trolling Motor (4 pgs.) Website visited Feb. 21, 2019 https://www.westmarine.com/buy/minn-kota--riptide-sf-112-bow-mount-trolling-motor-62-shaft-112-lb-thrust--15106362.

\* cited by examiner

TROLLING MOTOR WITH LOCAL AND REMOTE CONTROL MODES

FIELD OF THE INVENTION

Embodiments of the present invention relate generally to trolling motor assemblies and, more particularly, to systems, assemblies, and associated methods for providing a trolling motor with local and remote control modes.

BACKGROUND OF THE INVENTION

Trolling motors are often used during fishing or other marine activities. The trolling motors attach to the watercraft and propel the watercraft along a body of water. For example, trolling motors may provide secondary propulsion or precision maneuvering that can be ideal for fishing activities. The trolling motors, however, may also be utilized for the main propulsion system of watercraft. Applicant has developed systems, assemblies, and methods detailed herein to improve features and capabilities corresponding to trolling motors.

BRIEF SUMMARY OF THE INVENTION

Typically, trolling motors include either a local control assembly, such as a handle, or a remote control assembly, such as a foot pedal or handheld remote.

Locally controlled trolling motors may include a handle and throttle that are operated by the user to control the direction and force of the trolling motor. The locally controlled trolling motors offer a reliable means of operating the trolling motor. However, the control of the trolling motor is limited to the area proximate to the trolling motor and may not be convenient during some fishing operations. Additionally, local control utilizes at least one hand of the operator, which may hinder operation of other equipment including a fishing reel, radar device, navigation device, sonar device, or the like.

Remotely controlled trolling motors may include a wired or wireless remote and/or foot pedal that may have one or more control interfaces used to cause the trolling motor to steer in a desired direction and/or cause the motor to operate at a desired speed. The remote controlled trolling motor enables the user to operate the trolling motor without direct interaction with a handle, such as from a location distant from the motor or through hands-free operation. In this regard, a user is often able to operate other equipment simultaneously with the trolling motor. However, if the remote control interface is damaged or lost (e.g. falls overboard), losses power (e.g. battery failure), breaks, or the like, the operator may be unable to steer and/or start the trolling motor.

In some example embodiments of the present invention, a trolling motor is provided that is operable in both a remote mode and a local mode. The trolling motor includes a steering assembly, such as a drive belt or drive gear that steers the trolling motor in the remote mode based on command signals received from a wired or wireless controller (e.g., foot pedal, remote control, remote computing device, etc.). Additionally, however, the trolling motor includes a handle that enables the user to steer the trolling motor in a local mode. In some example embodiments, the trolling motor may receive an indication of the trolling motor entering the local mode and cause the steering assembly to be disabled, such that the user is now able to operate the trolling motor utilizing the handle.

In some embodiments, the automatic selection of the operating mode of the trolling motor may be determined based on the position of a movable handle. In this regard, in some example embodiments, the handle is configured to be moved between a stowed position and a steering position. The handle may rotate out of the main housing, may telescope in and out of the main housing, or the like. In the stowed position the handle may be at least partially within a main housing of the trolling motor. The stowed position may allow the main housing to rotate as the trolling motor is steered in the remote mode without the handle striking objects or persons. In the local mode, the handle may extend from the main housing to enable the user to rotate the trolling motor by operation of the handle. In some example embodiments, the trolling motor may include a handle sensor configured to sense that the handle is in the stowed position or the steering position. The indication of entering the local mode may be caused by the handle sensor sensing that the handle is in the steering position or not in the stowed position, e.g. that the handle is at least partially extended. In some such embodiments, utilizing the position of the handle to indicate the operation mode may provide a physical and/or visual confirmation for the user as to which mode of operation the trolling motor assembly is in.

In some example embodiments, the steering assembly may include an engagement mechanism that enables selective disabling of the steering assembly, such as to enable utilization of the handle in a local mode. An example engagement mechanism may include a belt drive and a tension arm. The trolling motor may cause the tension aim to apply tension to the belt drive to engage a shaft of the trolling motor in the remote mode and release tension applied to the belt drive in the local mode.

An example embodiment of the present invention includes a trolling motor system. The trolling motor system comprises a wired or wireless controller and a trolling motor assembly configured for attachment to a watercraft. The trolling motor assembly comprises a shaft defining a first end and a second end and a trolling motor at least partially contained within a trolling motor housing. The trolling motor housing is attached to the second end of the shaft. When the trolling motor assembly is attached to the watercraft and the trolling motor housing is submerged in a body of water, the trolling motor, when operating, is configured to propel the watercraft to travel along the body of water. The trolling motor assembly further includes a main housing connected to the shaft proximate the first end of the shaft. The main housing is configured to be positioned out of the body of water when the trolling motor assembly is attached to the watercraft and the trolling motor housing is submerged in the body of water. The trolling motor assembly further includes a steering assembly configured to steer the trolling motor housing about a first axis defined by the shaft to a plurality of directions. The steering assembly is configured to steer the trolling motor housing based on a steering command received from the wired or wireless controller in a remote mode. The trolling motor assembly further includes a handle configured to enable a user to steer the trolling motor housing about the first axis in a local mode. The system includes a processor and a memory including computer program code. The computer program code is configured to, when executed, cause the processor to receive one or more steering commands from the wired or wireless controller; cause the steering assembly to steer the trolling motor housing based on the one or more steering commands; receive an indication to enter the local mode;

and disable the steering assembly in response to receiving the indication to enter the local mode.

In some embodiments, the steering assembly comprises a drive belt, and disabling the steering assembly comprises releasing tension applied to the drive belt. In some embodiments, the steering assembly further comprises a tension arm configured to apply tension to the drive belt to cause the drive belt to engage a portion of the shaft in an engaged position. The tension aim is further configured to release the tension applied to the drive belt in a disengaged position.

In some embodiments, the handle is further configured to be moved between a stowed position and a steering position. At least a portion of the handle is disposed within the main housing when in the stowed position and the handle extends outward and away from the main housing when in the steering position. In some embodiments, the handle is configured to rotate between the stowed position and the steering positon about a second axis. In some embodiments, the handle is configured to telescope in and out of the main housing between the stowed position and the steering position. In some embodiments, the main housing further comprises a handle sensor configured to sense that the handle is at least one of in the stowed position or in the steering position. In some embodiments, the indication to enter the local mode comprises an indication from the handle sensor that the handle is at least one of in the steering position or not in the stowed position. In some embodiments, the main housing includes a handle capture feature configured to retain the handle in the stowed position.

In some embodiments, the handle comprises a throttle control.

In some embodiments, the computer program code is further configured to, when executed, cause the processor to receive a position lock command from the wired or wireless controller; determine a first location based on location data from a location sensor associated with the watercraft; and cause the trolling motor to maintain a location of the watercraft to be within a predetermined threshold distance of the first location.

In another example embodiment, a method is provided. The method comprises receiving one or more steering commands from a wired or wireless controller. The wired or wireless controller is configured to provide commands to a trolling motor assembly. The trolling motor assembly is configured for attachment to a watercraft. The trolling motor assembly comprises a shaft defining a first end and a second end and a trolling motor at least partially contained within a trolling motor housing. The trolling motor housing is attached to the second end of the shaft. When the trolling motor assembly is attached to the watercraft and the trolling motor housing is submerged in a body of water, the trolling motor, when operating, is configured to propel the watercraft to travel along the body of water. The trolling motor assembly includes a main housing connected to the shaft proximate the first end of the shaft. The main housing is configured to be positioned out of the body of water when the trolling motor assembly is attached to the watercraft and the trolling motor housing is submerged in the body of water. The trolling motor assembly further includes a steering assembly configured to steer the trolling motor housing about a first axis defined by the shaft to a plurality of directions. The steering assembly is configured to steer the trolling motor housing based on one or more steering commands received from the wired or wireless controller in a remote mode. The trolling motor assembly further includes a handle configured to enable a user to steer the trolling motor housing about the first axis in a local mode. The method further includes causing the steering assembly to steer the trolling motor housing based on the one or more steering commands; receiving an indication to enter the local mode; and disabling the steering assembly in response to the indication to enter the local mode.

In some embodiments, the steering assembly comprises a drive belt, and disabling the steering assembly comprises releasing tension applied to the drive belt. In some embodiments, the steering assembly further comprises a tension arm configured to apply tension to the drive belt causing the drive belt to engage a portion of the shaft in an engaged position and release the tension applied to the drive belt in a disengaged position.

In some embodiments, the method further comprises receiving an indication to enter the remote mode; and enabling the steering assembly in response to the indication to enter the remote mode.

In some embodiments, the handle is further configured to be moved between a stowed position and a steering position. At least a portion of the handle is disposed within the main housing when in the stowed position and the handle extends outward and away from the main housing when in the steering position. In some embodiments, the handle is configured to rotate between the stowed position and the steering positon about a second axis disposed in the main housing. In some embodiments, the handle is configured to telescope in and out of the main housing between the stowed position and the steering position. In some embodiments, the main housing further comprises a handle sensor configured to sense that the handle is at least one of in the stowed position or in the steering position, wherein receiving the indication to enter the local mode comprises receiving an indication from the handle sensor that the handle is at least one of in the steering position or not in the stowed position.

In yet another example embodiment, a trolling motor assembly comprises a wired foot pedal and a trolling motor subassembly configured for attachment to a watercraft. The wired foot pedal is connected to the trolling motor subassembly. The trolling motor subassembly comprises a shaft defining a first end and a second end and a trolling motor at least partially contained within a trolling motor housing. The trolling motor housing is attached to the second end of the shaft. When the trolling motor subassembly is attached to the watercraft and the trolling motor housing is submerged in a body of water, the trolling motor, when operating, is configured to propel the watercraft to travel along the body of water. The trolling motor assembly further includes a main housing connected to the shaft proximate the first end of the shaft. The main housing is configured to be positioned out of the body of water when the trolling motor subassembly is attached to the watercraft and the trolling motor housing is submerged in the body of water. The trolling motor assembly further includes a steering assembly configured to steer the trolling motor housing about a first axis defined by the shaft to a plurality of directions. The steering assembly is configured to steer the trolling motor housing based on a steering command received from the wired foot pedal in a remote mode. The trolling motor assembly further includes a handle configured to enable a user to steer the trolling motor housing about the first axis in a local mode. The trolling motor assembly further comprises a processor and a memory including computer program code. The computer program code is configured to, when executed, cause the processor to receive one or more steering commands from the wired foot pedal; cause the steering assembly to steer the trolling motor housing based on the one or more steering commands; receive an indication to enter the local mode; and disable the steering assembly in response to receiving the indication to enter the local mode.

BRIEF DESCRIPTION OF THE DRAWINGS

Figure 1:
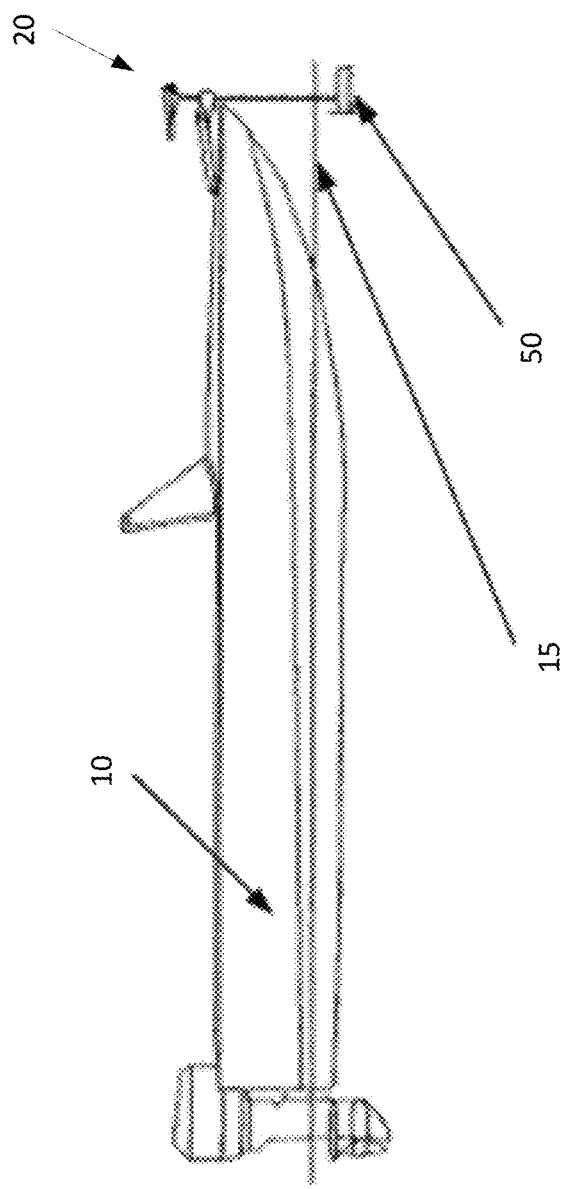
Figure 2:
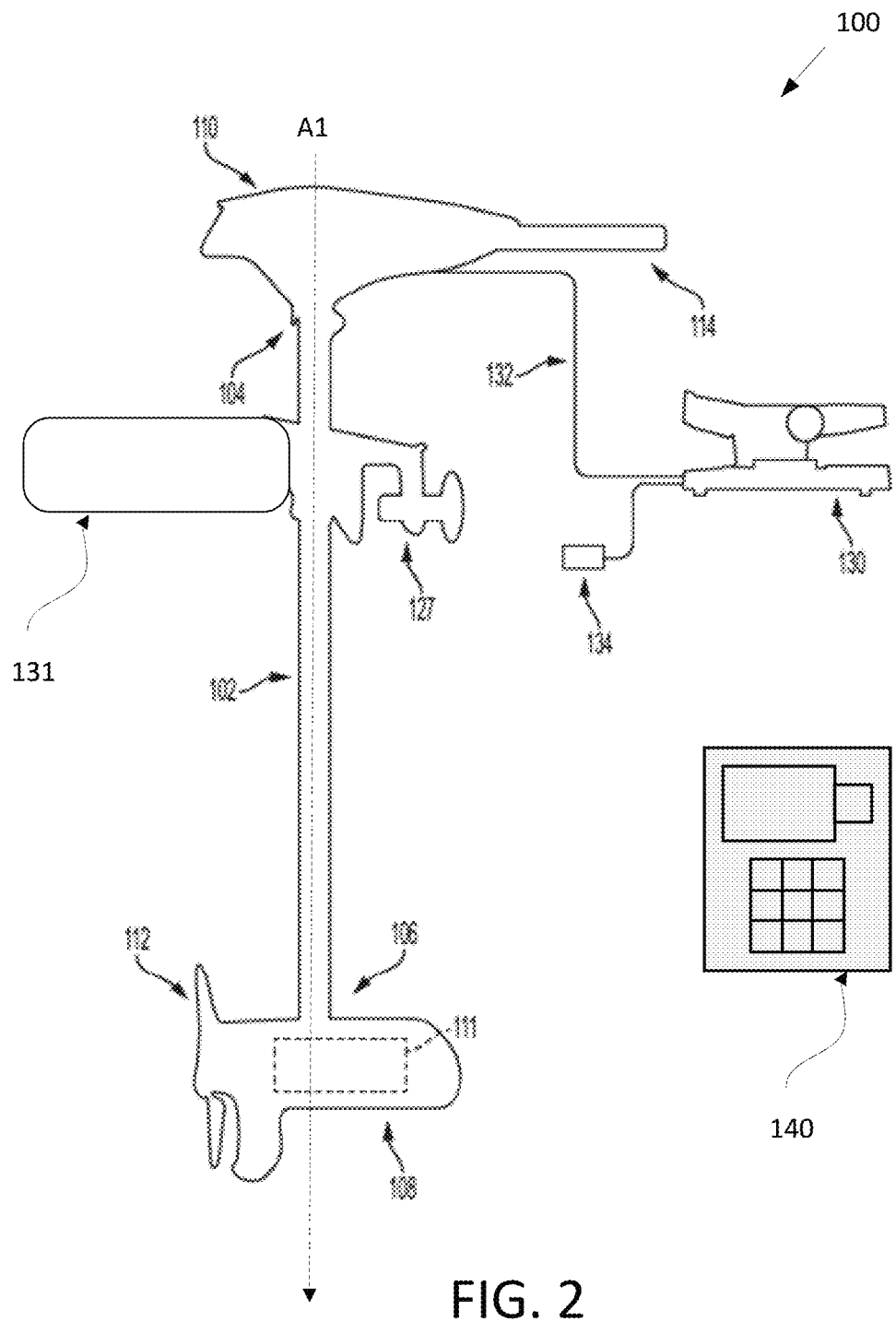
Figure 3A:
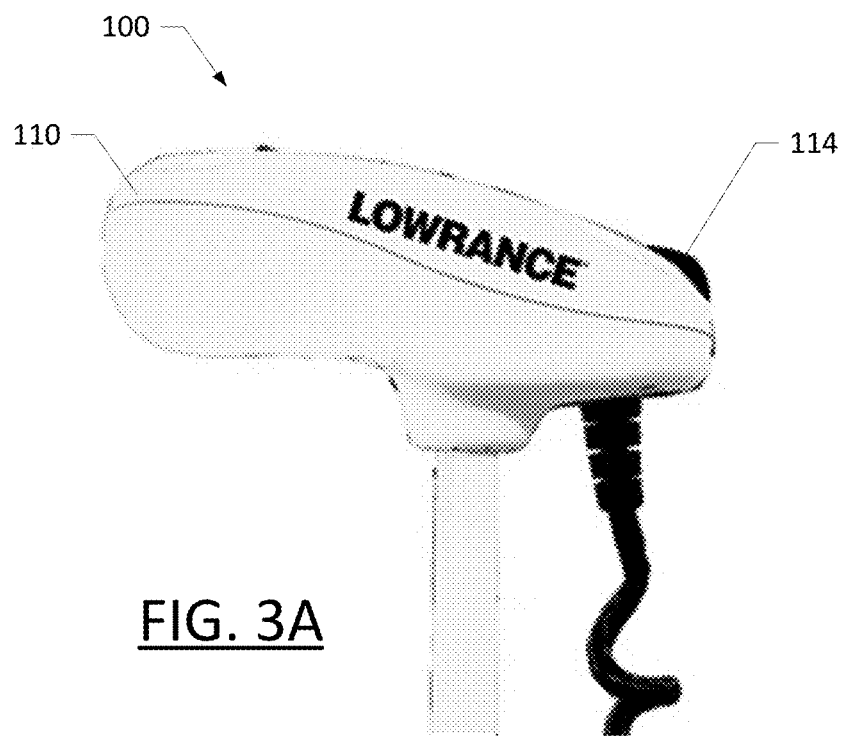
Figure 3B:
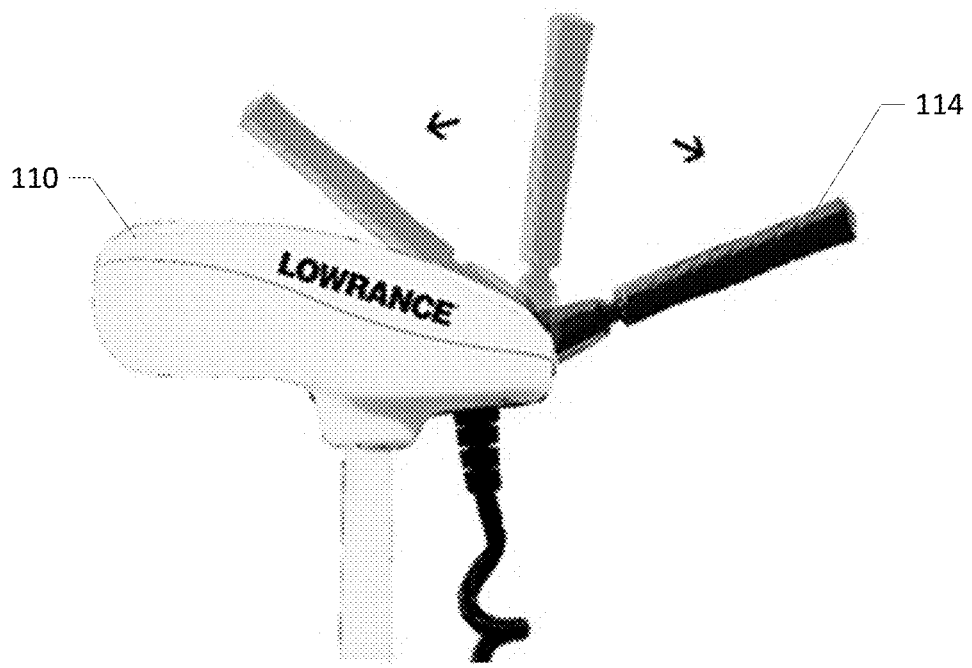
Figure 4A:
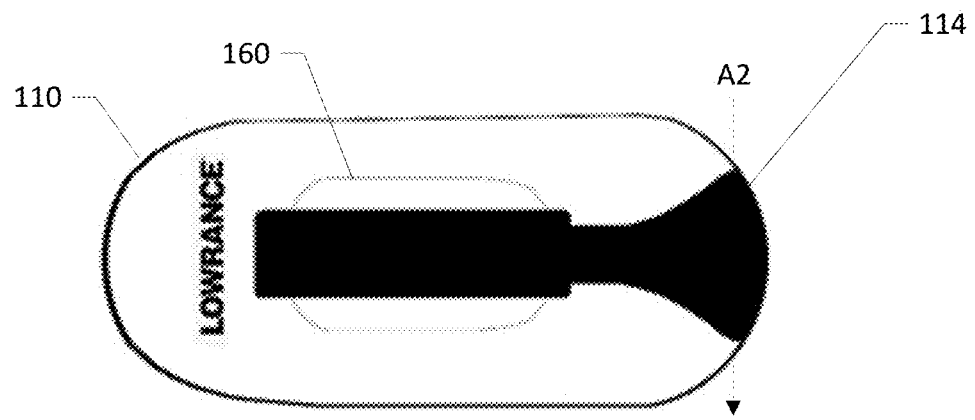
Figure 4B:
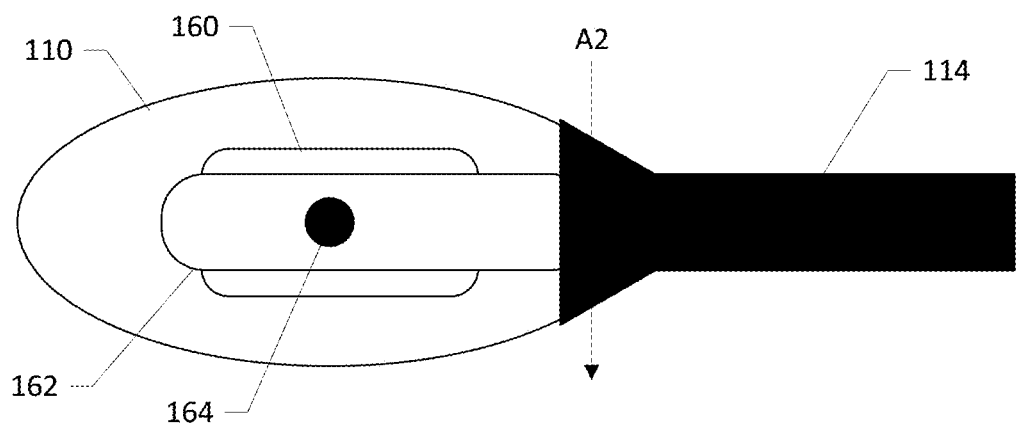
Figure 5A:
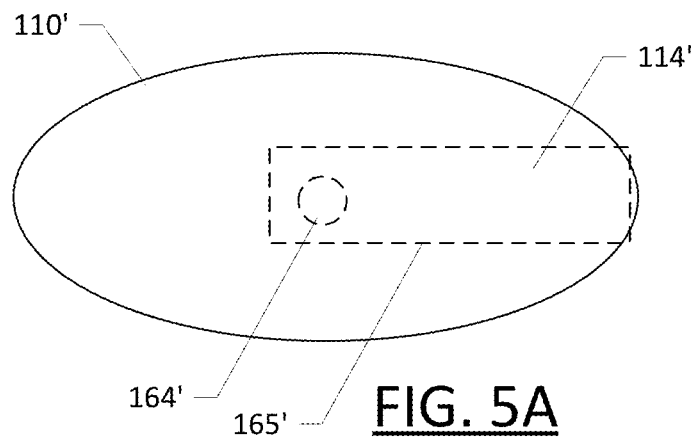
Figure 5B:
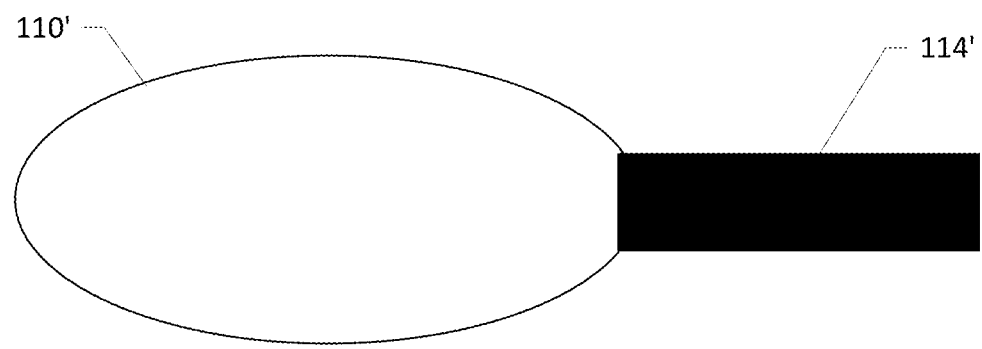
Figure 6:
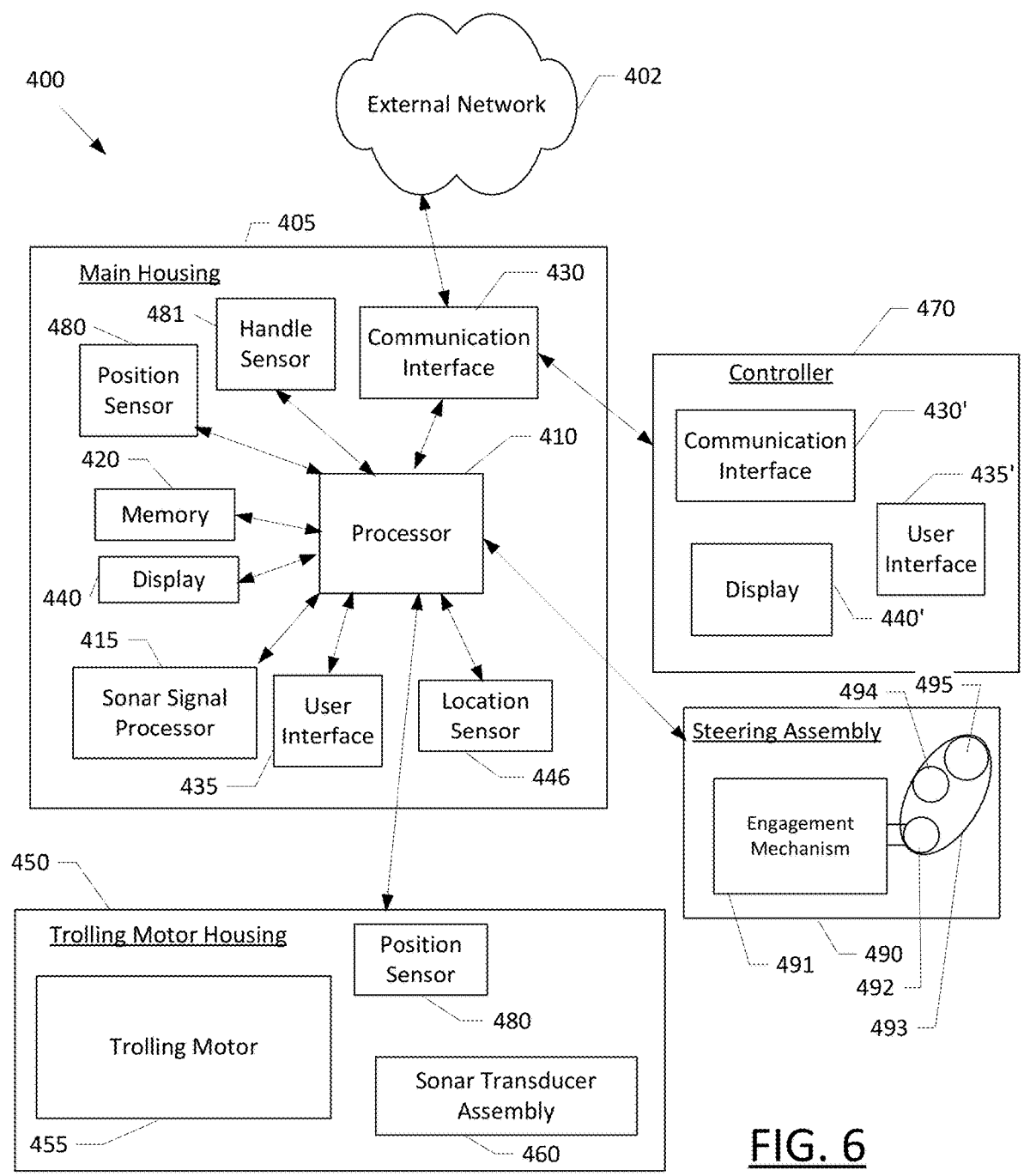
Figure 7:
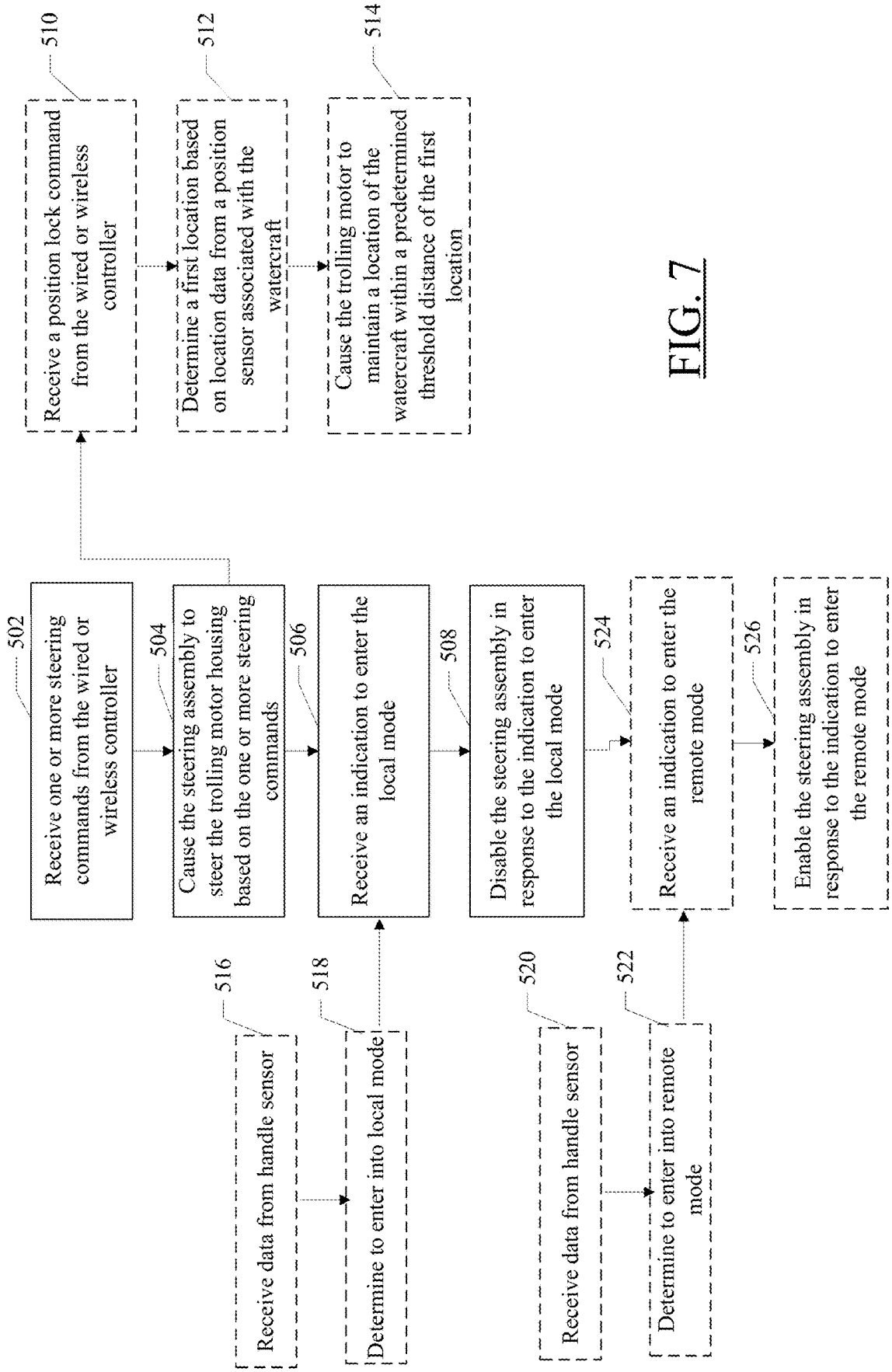

Having thus described the invention in general terms, reference will now be made to the accompanying drawings, which are not necessarily drawn to scale, and wherein:

FIG. 1 illustrates an example trolling motor assembly attached to a front of a watercraft, in accordance with some embodiments discussed herein;

FIG. 2 shows an example trolling motor assembly, in accordance with some embodiments discussed herein;

FIGS. 3A and 3B show a side view of a trolling motor assembly with a handle rotating from a stowed position to a steering position, in accordance with some embodiments discussed herein;

FIG. 4A shows a top view schematic illustration of a portion of a trolling motor assembly with a handle in a stowed position, in accordance with some embodiments discussed herein;

FIG. 4B shows a top view schematic illustration of a portion of a trolling motor assembly with a handle in a steering position, in accordance with some embodiments discussed herein;

FIGS. 5A and 5B show a top view schematic illustration of a portion of a trolling motor assembly with a handle extending in a telescoping manner from a stowed position to a steering position, in accordance with some embodiments discussed herein;

FIG. 6 shows a block diagram illustrating a marine system including an example trolling motor assembly, in accordance with some embodiments discussed herein; and FIG. 7 illustrates a flowchart of an example method for processing marine data and generating an image according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Some embodiments of the present invention provide trolling motor assemblies with multiple control modes. Some such example embodiments enable a trolling motor with at least a remote mode and a local mode of operation. The remote mode enables the user to operate the trolling motor in a location distant from the immediate handle of the trolling motor and/or in a hands-free manner. The local mode provides the reliability of operation in an instance in which the remote control fails, is lost or damaged, or is otherwise unavailable.

In some embodiments, the handle used for operation in the local mode may be movable between a stowed position at least partially within the main housing and a steering position extending from the main housing. The stowed position may allow the main housing to rotate as the trolling motor is steered in the remote mode without the handle striking objects or persons. In some embodiments, a handle sensor may be provided and used to determine the operating mode, such that the trolling motor automatically, without, user input, shifts from the remote mode to the local mode upon an indication of the handle not being in the stowed position. This feature may further limit or prevent the handle from striking objects or persons in the remote mode.

FIG. 1 illustrates an example watercraft 10 on a body of water 15. The watercraft 10 has a trolling motor assembly 20 attached to its front, with a trolling motor 50 submerged in the body of water. The trolling motor can be used as a propulsion system to cause the watercraft to travel along the surface of the water. While the depicted embodiment shows the trolling motor assembly 20 attached to the front of the watercraft 10 and as a secondary propulsion system, example embodiments described herein contemplate that the trolling motor assembly 20 may be attached in any position on the watercraft 10 and/or may be the primary propulsion system for the watercraft 10.

Depending on the design, a trolling motor may be gas-powered or electric. Moreover, steering may be accomplished manually via hand control, via foot control, or even through use of a remote control. Additionally, in some cases, an autopilot may operate the trolling motor autonomously. As indicated herein, embodiments of the present invention contemplate a trolling motor configured to be controlled locally (via a handle) and remotely (via a wired or wireless remote).

FIG. 2 illustrates an example trolling motor assembly 100 that is electric and may be controlled with a foot pedal assembly 130. The trolling motor assembly 100 includes a shaft 102 defining a first end 104 and a second end 106, a trolling motor housing 108, and a main housing 110. The trolling motor housing 108 is attached to the second end 106 of the shaft 102 and at least partially contains a propulsion motor 111, or trolling motor, that connects to a propeller 112. As shown in FIG. 1, in some embodiments, when the trolling motor assembly is attached to the watercraft 10 and the propulsion motor 111 (or trolling motor housing) is submerged in the water, the propulsion motor is configured to propel the watercraft to travel along the body of water. In addition to containing the propulsion motor 111, the trolling motor housing 108 may include other components such as, for example, a sonar transducer assembly and/or other sensors or features (e.g., lights, temperature sensors, etc.).

The main housing 110 is connected to the shaft 102 proximate the first end 104 of the shaft 102 and includes a hand control rod 114, e.g. handle, that enables control of the propulsion motor 111 by a user (e.g., through angular rotation about axis A1). The depicted example also includes a foot pedal assembly 130 that is enabled to control operation of the trolling motor assembly 100 for some embodiments described herein. As shown in FIG. 1, in some embodiments, when the trolling motor assembly is attached to the watercraft and the propulsion motor 111 is submerged in the water, the main housing 110 is positioned out of the body of water and visible/accessible by a user. The main housing 110 may be configured to house components of the trolling motor assembly, such as may be used for processing marine data and/or controlling operation of the trolling motor, among other things. For example, depending on the configuration and features of the trolling motor assembly, the trolling motor assembly 100 may contain, for example, one or more of a processor, a sonar assembly, memory, a communication interface, an autopilot navigation assembly, a speed actuator, and a steering actuator for the propulsion motor 111.

Referring to FIG. 2, as noted, in some embodiments, the trolling motor assembly 100 includes a foot pedal assembly 130 that is electrically connected to the propulsion motor 111 (such as through the main housing 110) using a cable 132 (although it could be connected wirelessly). The foot pedal assembly 130 may enable a user to steer and/or otherwise operate the trolling motor assembly 100 to control the direction and speed of travel of the watercraft. In an example embodiment, the foot pedal assembly 130 may provide steering commands, which in turn are used to cause a steering assembly 131 to steer the trolling motor housing 108 about axis A1 to a desired direction. In some embodiments, though not shown, the foot pedal assembly 130 may be connected to the shaft 102 and utilize direct mechanical steering (such as through ropes/wires) to cause steering of the trolling motor housing 108. Further, depending on the configuration of the foot pedal assembly, the foot pedal assembly 130 may include an electrical plug 134 that can be connected to an external power source.

Additionally or alternatively, the trolling motor assembly 100 may include a handheld remote control 140. The handheld control 140 may be wired or wirelessly connected to the main housing and provide steering commands, similar to the steering commands discussed above with reference to the foot pedal assembly 130. The handheld control 140 may be a dedicated control or may be a control interface executed on a user device, such as a tablet computer, smart phone, or the like.

The trolling motor assembly 100 may also include an attachment device 127 (e.g., a clamp, a mount, or a plurality of fasteners) to enable connection or attachment of the trolling motor assembly 100 to the watercraft. Depending on the attachment device used, the trolling motor assembly 100 may be configured for rotational movement relative to the watercraft about the shaft's axis, including, for example, 360 degree rotational movement.

FIGS. 3A and 3B show a side view of a portion of a trolling motor assembly 100 with a handle 114 rotatable between a stowed position (shown in FIG. 3A) to a steering position (e.g., shown in FIG. 3B). The main housing 110 may include processing circuitry, such as a processor 410 and a memory 420 discussed below and shown in FIG. 6. The processing circuitry may be configured to control the steering assembly 131 based on a current operating mode.

In some example embodiments, the processor may determine whether operation should occur in a local mode or a remote mode based on the position of the handle 114. In the local mode, the handle 114 may extend outward and away from the main housing 110, such that the operator may grasp the handle and rotate the main housing 110, shaft 102, and trolling motor housing 106 to the desired direction. Additionally, the handle 114 may include a throttle such thumb lever throttle, or a rotating hand throttle configured to control the speed of the trolling motor 111 in the local mode.

In the remote mode, the handle may be at least partially disposed within the main housing 110 and/or not in the steering position. The trolling motor assembly may be steered remotely using the handheld control 140, the foot pedal assembly 130, and/or other remote computing device (such as a remote marine electronics device—e.g., a device used for controlling other features of the watercraft). For example, the processing circuitry may be configured to operate in the remote mode when the handle 114 is in the stowed position, such as depicted in FIG. 3A. The processing circuitry may transition to the local mode upon an indication of the handle 114 being in the steering position or an indication of the handle 114 being out of the stowed position, such as depicted in FIG. 3B with the handle 114 rotated to the right of the main housing 110.

In the embodiment depicted in FIGS. 3A-4B, the handle 114 is configured to rotate between the stowed position and the steering position about a second axis A2 (such as shown FIGS. 4A and 4B). In some embodiments, the second axis A2 may be perpendicular to the axis of rotation of the shaft 102. In some embodiments, other forms of moving the handle between a stowed position and a steering position are contemplated. For example, in the embodiment depicted in FIGS. 5A and 5B, the handle 114' is configured to telescope in and out of the main housing 110' between the stowed position and the steering position.

Turning to operation of the trolling motor assembly 100, in the remote mode, the processing circuitry may receive one or more steering commands from the wired or wireless controller, e.g. foot pedal assembly 130 or handheld control 140. The processor may, in turn, cause the steering assembly 131 to steer the trolling motor housing 108 based on the one or more steering commands. For example, the processing circuitry may cause a steering motor of the steering assembly 131 to energize and cause rotation of the shaft 102 in a first direction. The steering motor may cause a drive belt, drive gears, or the like to rotate the shaft 102 about axis A1 to a desired direction. Similarly, the steering motor may be energized and rotate in a second direction opposite the first direction, thus causing the trolling motor housing 108 to rotate about axis A1 in the opposite direction to a desired direction.

In some example embodiments, the steering assembly 131 may include one or more engagement mechanisms (e.g., 491 shown in FIG. 6), such as a clutch, a tension arm, a gear positioning arm, or the like. In the remote mode, the engagement mechanism may be in an engaged position enabling the force of the steering motor to be transferred to the shaft 102, such as through a drive belt or drive gears. For example, the engagement mechanism may include a tension arm configured to apply tension to the drive belt to cause the drive belt to engage a portion of the shaft 102 in the engaged position. Similarly, the tension arm may be configured to release the tension applied to the drive belt in a disengaged position, such as to enable operation in the local mode (e.g., using the handle 114).

In some embodiments, the processing circuitry may be further configured to receive an indication to enter the local mode and disable the steering assembly in response to receiving the indication to enter the local mode. For example, the trolling motor assembly 100 may include a handle sensor 164/164' (FIGS. 4B and 5A) configured to sense a position or non-position of the handle 114 (e.g., if the handle 114 is in the stowed position of the steering position or if the handle 114 is not in the stowed position or not in the steering position). In some embodiments, the handle sensor may be positioned differently so as to enable sensing of different positions of the handle 114. In some embodiments, multiple handle sensors may be employed for additional accuracy and/or reliability (e.g., a first handle sensor may be positioned on the main housing to determine if the handle is in the stowed positions and a second handle sensor may positioned to enable sensing if the handle is in the steering position).

The handle sensor 164, 164' may be any type of sensor, such as light sensor (e.g. photoelectric sensor), a push button, an electrical contact, electromagnetic sensor, an accelerometer, position/direction sensor, or the like. In some example embodiments, the handle 114 is configured to engage the handle sensor 164, 164' in the stowed position and not engage the handle sensor 164, 164' when the handle 114 is in the steering position or transitioning between the stowed position and the steering position. The handle sensor 164, 164', thereby, indicates when the handle 114 is in the stowed position and when the handle is not in the stowed position. Another example handle sensor includes an accelerometer and/or position/direction sensor(s) that may be positioned within or relative to the handle 114. Movement or the direction of the handle 114 may be sensed and used to detelinine the position of the handle such as to determine which mode of operation the trolling motor assembly should be in.

In response to receiving an indication of the handle 114 not in the stowed position, the processing circuitry may be configured to disable the steering assembly 131, such as by causing the engagement mechanism to shift to the disengaged position (e.g., releasing the tension applied to the drive belt). With the engagement mechanism in the disengaged position, the shaft 102 may be enabled to rotate freely, e.g. with negligible force applied by the steering assembly, such that an operator may turn the main housing 110 without significant resistance from the steering assembly 131.

In some embodiments, the processing circuitry may be further configured to receive an indication to enter the remote mode and enable the steering assembly in response to receiving the indication to enter the remote mode. For example, in some embodiments, the handle sensor (or other sensor) may indicate that the handle has returned to the stowed position or that the handle has moved from the steering position. In response, the processing circuitry may determine that the trolling motor assembly should enter the remote mode of operation and cause the steering assembly to enable such operation (such as by re-engaging the shaft or corresponding structure). In some embodiments, the indication to enter the remote mode may occur even if the handle is in the steering position and/or through other means besides the determined position or relative position of the handle. For example, instruction from a remote computing device (e.g., a wired or wireless controller, as described herein) may cause the trolling motor assembly to enter the remote mode. Additional buttons or other user input locally (e.g., on the main housing) or remotely is also contemplated.

FIGS. 4A and 4B illustrate a top view of a portion of a trolling motor assembly 100 with a handle 114 rotating from a stowed position to a steering position. The main housing 110 may include a handle recess 162 configured to receive at least a portion of the handle 114 when the handle 114 is in the stowed position. In an example embodiment, the handle sensor 164 may be disposed in the handle recess 162, such that when the handle 114 is placed in the stowed position in the handle recess 162, the handle 114 engages the handle sensor 164. In some example embodiments, the main housing 110 may include a finger recess 160 disposed on at least one side of the handle recess 162. The finger recess 160 may enable access for the user to grip a portion of the handle 114 to rotate the handle 114 out of the stowed position to the steering position. In some example embodiment, the main housing 110 may include one or more handle captures, for example stowage straps, detents, magnets, or the like, configured to retain the handle 114 when it is in the stowed position. Such a handle capture feature may prevent or limit unintended movement of the handle out of the stowed position, which may be beneficial for ensuring operation in the desired mode occurs.

FIGS. 5A and 5B illustrate a schematic top view of a portion of a trolling motor assembly 100' with a handle 114' that is configured to telescope from a stowed position to a steering position. In an example embodiment, the main housing 110' may include handle cavity 165' disposed within the main housing 110. The handle 114' may be configured to be retracted within the handle cavity 165' when in the stowed position. The handle 114' may be configured to extend out of the handle cavity 165', outward and away from the main housing 110', in the steering position. In an example embodiment, the handle sensor 164' may be disposed in the handle cavity 165', such that when the handle 114' is placed in the stowed position in the handle cavity 165', the handle 114' engages the handle sensor 164'. In some example embodiments, main housing 110' may include one or more handle captures, for example magnets, detents, threads, clips, or the like, configured to retain the handle 114' in the stowed position. In some embodiments, a release mechanism (e.g., a button) may enable release (such as through a bias or other form) of the handle 114' for movement away from the stowed position.

In some example embodiments, the trolling motor assembly 100 may be configured to enable various features. An example such feature is a virtual anchor or position lock. The processing circuitry may be in communication with or include a location sensor, such as a global position system (GPS) sensor configured to determine a current location of the watercraft 10 (or the trolling motor assembly 100 mounted thereto). The processing circuitry may receive a position lock command, such as from the foot pedal assembly 130 or handheld control 140. The processing circuitry determine a first location based on location data from the location sensor and cause the trolling motor assembly 100 to maintain a location of the watercraft 10 within a predetermined threshold distance of the first location, such as 5 ft., 10 ft., or other suitable distance. The processing circuitry may generate one or more steering commands to steer the trolling motor housing 108 to the desired direction to maintain the location of the watercraft 10 within the predetermined threshold distance. Additionally, the processing circuitry may cause the trolling motor 111 to energize and de-energize to propel the watercraft 10 in the desired direction. While the virtual anchor or position lock feature is described herein, other features, such as maintain a heading, go to a waypoint, create a waypoint, etc. are contemplated.

Example System Architecture

FIG. 6 shows a block diagram of an example trolling motor system 400 capable for use with several embodiments of the present invention. As shown, the trolling motor system 400 may include a number of different modules or components, each of which may comprise any device or means embodied in either hardware, software, or a combination of hardware and software configured to perform one or more corresponding functions. For example, the trolling motor system 400 may include a main housing 405, a trolling motor housing 450, a controller 470, and a steering assembly 490.

The trolling motor system 400 may also include one or more communications modules configured to communicate with one another in any of a number of different manners including, for example, via a network. In this regard, the communication interface (e.g., 430) may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral, remote devices such as one or more wired or wireless multi-function displays may be connected to the trolling motor system 400.

The main housing 405 may include a processor 410, a sonar signal processor 415, a memory 420, a communication interface 430, display 440, user interface 435, and one or more sensors (e.g., location sensor 446, a position sensor 480, handle sensor 481, etc.).

The processor 410 and/or a sonar signal processor 415 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein.

In this regard, the processor 410 may be configured to analyze electrical signals communicated thereto to provide display data to the display 440 (or other remote display). In some embodiments, the current mode of operation (e.g., local or remote) may be indicated via a user interface, such as a display. In some example embodiments, the processor 410 or sonar signal processor 415 may be configured to receive sonar data indicative of the size, location, shape, etc. of objects detected by the system 400 (such as from sonar transducer assembly 460). For example, the processor 410 may be configured to receive sonar return data and process the sonar return data to generate sonar image data for display to a user. In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc.

The memory 420 may be configured to store instructions, computer program code, marine data, such as sonar data, chart data, location/position data, and other data associated with the sonar system in a non-transitory computer readable medium for use, such as by the processor.

The communication interface 430 may be configured to enable connection to external systems (e.g., an external network 402). In this manner, the processor 410 may retrieve stored data from a remote, external server via the external network 402 in addition to or as an alternative to the onboard memory 420.

The position sensor 480 may be found in one or more of the main housing 405, the trolling motor housing 450, steering assembly 490, or remotely. In some embodiments, the position sensor 480 may be configured to determine a direction of which the trolling motor housing is facing. In some embodiments, the position sensor 480 may be operably coupled to either the shaft or steering assembly 490, such that the position sensor 480 measures the rotational change in position of the trolling motor housing 450 as the trolling motor is turned. The position sensor 480 may be a magnetic sensor, a light sensor, mechanical sensor, or the like.

The location sensor 446 may be configured to determine the current position and/or location of the main housing 405. For example, the location sensor 446 may comprise a GPS, bottom contour, inertial navigation system, such as micro electro-mechanical sensor (MEMS), a ring laser gyroscope, or the like, or other location detection system.

The handle sensor 481 may be any type of sensor (or sensors) configured to determine a position or relative position of the handle of the trolling motor system 400, such as for use in determination as to which operation mode to be in. For example, handle sensor 481 may embody example handle sensors 164, 164' described herein.

The display 440 may be configured to display images and may include or otherwise be in communication with a user interface 435 configured to receive input from a user. The display 440 may be, for example, a conventional LCD (liquid crystal display), an LED display, or the like. In some example embodiments, additional displays may also be included, such as a touch screen display, mobile device, or any other suitable display known in the art upon which images may be displayed. In any of the embodiments, the display 440 may be configured to display an indication of the current direction of the trolling motor housing 450 relative to the watercraft. Additionally, the display may be configured to display other relevant trolling motor information including, but not limited to, speed data, motor data battery data, current operating mode, auto pilot, operation mode, or the like.

The user interface 435 may include, for example, a keyboard, keypad, function keys, mouse, scrolling device, input/output ports, touch screen, or any other mechanism by which a user may interface with the system.

The trolling motor housing 450 may include a trolling motor 455, a sonar transducer assembly 460, and one or more other sensors (e.g., a motor sensor, position sensor 480, water temperature sensor, water current sensor, etc.), which may each be controlled through the processor 410 (such as detailed herein).

The controller 470 may include a foot pedal assembly, such as foot pedal assembly 130 (FIG. 2) or a handheld controller, such as handheld controller 140 (FIG. 2). The controller 470 may be in communication with the processor 410 via wired or wireless communication. The controller may provide steering commands to the processor 410. The processor 410 may, in turn, cause the steering assembly to steer the trolling motor housing 450 and/or operate the trolling motor 455 based on the steering commands. The controller may include a user interface 435', a display 440', and/or a communication interface 430' (such as for wired or wireless communication).

The display 440' may be configured to display images and may include or otherwise be in communication with a user interface 435' configured to receive input from a user. The display 440' may be, for example, a conventional LCD (liquid crystal display), an LED display, or the like. In some example embodiments, additional displays may also be included, such as a touch screen display, mobile device, or any other suitable display known in the art upon which images may be displayed. In any of the embodiments, the display 440' may be configured to display an indication of the current direction of the trolling motor housing 450 relative to the watercraft. Additionally, the display may be configured to display other relevant trolling motor information including, but not limited to, speed data, motor data battery data, current operating mode, auto pilot, operation mode, or the like.

The user interface 435' may include, for example, a keyboard, keypad, function keys, mouse, scrolling device, input/output ports, touch screen, or any other mechanism by which a user may interface with the system.

In an example embodiment, the steering assembly 490, similar to steering assembly 131 (FIG. 2) may include a motor 495 (or other mechanism) configured to engage and rotate the shaft of the trolling motor assembly. For example, the motor 495 may, rotate to move a belt drive 493, gear drive, or the like. The drive belt 493 may rotate shaft (shown as 494, similar to shaft 102 (FIG. 2)) to cause the trolling motor housing 450 to be positioned to a desired direction of a plurality of directions. The steering assembly 490 may include an engagement mechanism 491, such as a tension arm 492, that is configured to enable the steering assembly 490 to be engaged during operation in the remote mode and disengaged, or disabled, during operation in the local mode. In some example embodiments, the engagement mechanism (e.g., a tension arm actuator) may be configured to move the tension arm 492 to an engaged position to apply tension to the drive belt 493 to cause the drive belt 493 to engage a portion of the shaft 494. The engagement mechanism may also be configured to move the tension arm 492 to a disengaged position releasing the tension applied to the drive belt 493. The drive belt 493 and tension atm 492 are illustrative of an example engagement mechanism, and one of ordinary skill in the art would immediately appreciate that other engagement mechanisms may be substituted, such as a clutch, gear positioning aim, or the like.

Example Flowchart(s) and Operations

Embodiments of the present invention provide various methods for controlling operational modes of the trolling motor system. Various examples of the operations performed in accordance with embodiments of the present invention will now be provided with reference to FIG. 7.

FIG. 7 illustrates a flowchart according to an example method for operating a trolling motor according to an example embodiment. The operations illustrated in and described with respect to FIG. 7 may, for example, be performed by, with the assistance of, and/or under the control of one or more of the processor 410, sonar signal processor 415, memory 420, communication interface 430, user interfaces 435, location sensor 446, display 440, handle sensor 481, position sensor 480, controller 470, and/or steering assembly 490.

The method for operating the trolling motor related data depicted in FIG. 7 may include receiving one or more steering commands from the wired or wireless controller at operation 502, causing the steering assembly to steer the trolling motor housing based on the one or more steering commands at operation 504, receiving an indication to enter the local mode at operation 506, and disabling the steering assembly in response to the indication to enter the local mode.

In some embodiments, the method for operating the trolling motor may include additional, optional operations, and/or the operations described above may be modified or augmented. Some examples of modifications, optional operations, and augmentations are described below, as indicated by dashed lines, such as receiving a position lock command from the wireless control at operation 510, determining a first location based on location data from a location sensor associated with the watercraft at operation 512, and causing the trolling motor to maintain a location of the watercraft within a predetermined threshold distance of the first location at operation 514.

In some embodiments, the method may include receiving an indication, such as from a handle sensor, that the handle of the trolling motor assembly is in a certain position or out of a certain position at operation 516 and determine that the trolling motor assembly should change modes to the local mode at operation 518 (which may be the same step as operation 506). Similarly, the method may include receiving an indication, such as from a handle sensor, that the handle of the trolling motor assembly is in a certain position or out of a certain position at operation 520, determine that the trolling motor assembly should change modes to the remote mode at operation 522, receive an indication to enter the remote mode at operation 524 (which may be the same step as operation 522), and causing the steering assembly to enable in response thereto at operation 526.

FIG. 7 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A trolling motor system comprising:
a wired or wireless controller; and
a trolling motor assembly configured for attachment to a watercraft, wherein the trolling motor assembly comprises:
   a shaft defining a first end and a second end;
   a trolling motor at least partially contained within a trolling motor housing, wherein the trolling motor housing is attached to the second end of the shaft, wherein, when the trolling motor assembly is attached to the watercraft and the trolling motor housing is submerged in a body of water, the trolling motor, when operating, is configured to propel the watercraft to travel along the body of water;
   a main housing connected to the shaft proximate the first end of the shaft, wherein the main housing is configured to be positioned out of the body of water when the trolling motor assembly is attached to the watercraft and the trolling motor housing is submerged in the body of water;
   a steering assembly configured to steer the trolling motor housing about a first axis defined by the shaft to a plurality of directions; wherein the steering assembly is configured to steer the trolling motor housing based on a steering command received from the wired or wireless controller in a remote mode, wherein the steering assembly comprises a drive belt;
   a handle configured to enable a user to steer the trolling motor housing about the first axis in a local mode;
   a processor; and
   a memory including computer program code configured to, when executed, cause the processor to:
      receive one or more steering commands from the wired or wireless controller;
      cause the steering assembly to steer the trolling motor housing based on the one or more steering commands;
      receive an indication to enter the local mode; and
      disable the steering assembly in response to receiving the indication to enter the local mode by releasing tension applied to the drive belt.

2. The trolling motor system of claim 1, wherein the steering assembly further comprises a tension arm configured to:
apply tension to the drive belt to cause the drive belt to engage a portion of the shaft in an engaged position; and
release the tension applied to the drive belt in a disengaged position.

3. The trolling motor system of claim 1, wherein the handle is further configured to be moved between a stowed position and a steering position, wherein at least a portion of the handle is disposed within the main housing when in the stowed position and the handle extends outward and away from the main housing when in the steering position.

4. The trolling motor system of claim 3, wherein the handle is configured to rotate between the stowed position and the steering position about a second axis.

5. The trolling motor system of claim 3, wherein the handle is configured to telescope in and out of the main housing between the stowed position and the steering position.

6. The trolling motor system of claim 3, wherein the main housing further comprises a handle sensor configured to sense that the handle is at least one of in the stowed position or in the steering position.

7. The trolling motor system of claim 6, wherein the indication to enter the local mode comprises an indication from the handle sensor that the handle is at least one of in the steering position or not in the stowed position.

8. The trolling motor system of claim 3, wherein the main housing includes a handle capture feature configured to retain the handle in the stowed position.

9. The trolling motor system of claim 1, wherein the handle comprises a throttle control.

10. The trolling motor system of claim 1, wherein the computer program code is further configured to, when executed, cause the processor to:
receive a position lock command from the wired or wireless controller;
determine a first location based on location data from a location sensor associated with the watercraft; and
cause the trolling motor to maintain a location of the watercraft to be within a predetermined threshold distance of the first location.

11. A method comprising:
receiving one or more steering commands from a wired or wireless controller, wherein the wired or wireless controller is configured to provide commands to a trolling motor assembly, wherein the trolling motor assembly is configured for attachment to a watercraft, wherein the trolling motor assembly comprises:
   a shaft defining a first end and a second end;
   a trolling motor at least partially contained within a trolling motor housing, wherein the trolling motor housing is attached to the second end of the shaft, wherein, when the trolling motor assembly is attached to the watercraft and the trolling motor housing is submerged in a body of water, the trolling motor, when operating, is configured to propel the watercraft to travel along the body of water;
   a main housing connected to the shaft proximate the first end of the shaft, wherein the main housing is configured to be positioned out of the body of water when the trolling motor assembly is attached to the watercraft and the trolling motor housing is submerged in the body of water;
   a steering assembly configured to steer the trolling motor housing about a first axis defined by the shaft to a plurality of directions; wherein the steering assembly is configured to steer the trolling motor housing based on one or more steering commands received from the wired or wireless controller in a remote mode, wherein the steering assembly comprises a drive belt; and
   a handle configured to enable a user to steer the trolling motor housing about the first axis in a local mode;
causing the steering assembly to steer the trolling motor housing based on the one or more steering commands;
receiving an indication to enter the local mode; and
disabling the steering assembly in response to the indication to enter the local mode by releasing tension applied to the drive belt.

12. The method of claim 11, wherein the steering assembly further comprises a tension arm configured to:
apply tension to the drive belt causing the drive belt to engage a portion of the shaft in an engaged position; and release the tension applied to the drive belt in a disengaged position.

13. The method of claim 11 further comprising:
receiving an indication to enter the remote mode; and
enabling the steering assembly in response to the indication to enter the remote mode.

14. The method of claim 11, wherein the handle is further configured to be moved between a stowed position and a steering position, wherein at least a portion of the handle is disposed within the main housing when in the stowed position and the handle extends outward and away from the main housing when in the steering position.

15. The method of claim 14, wherein the handle is configured to rotate between the stowed position and the steering position about a second axis disposed in the main housing.

16. The method of claim 14, wherein the handle is configured to telescope in and out of the main housing between the stowed position and the steering position.

17. The method of claim 14, wherein the main housing further comprises a handle sensor configured to sense that the handle is at least one of in the stowed position or in the steering position, wherein receiving the indication to enter the local mode comprises receiving an indication from the handle sensor that the handle is at least one of in the steering position or not in the stowed position.

18. A trolling motor assembly comprising:
a wired foot pedal; and
a trolling motor subassembly configured for attachment to a watercraft, wherein the wired foot pedal is connected to the trolling motor subassembly, wherein the trolling motor subassembly comprises:
a shaft defining a first end and a second end;
a trolling motor at least partially contained within a trolling motor housing, wherein the trolling motor housing is attached to the second end of the shaft, wherein, when the trolling motor subassembly is attached to the watercraft and the trolling motor housing is submerged in a body of water, the trolling motor, when operating, is configured to propel the watercraft to travel along the body of water;
a main housing connected to the shaft proximate the first end of the shaft, wherein the main housing is configured to be positioned out of the body of water when the trolling motor subassembly is attached to the watercraft and the trolling motor housing is submerged in the body of water;
a steering assembly configured to steer the trolling motor housing about a first axis defined by the shaft to a plurality of directions; wherein the steering assembly is configured to steer the trolling motor housing based on a steering command received from the wired foot pedal in a remote mode;
a handle configured to enable a user to steer the trolling motor housing about the first axis in a local mode, wherein the handle is further configured to be moved between a stowed position and a steering position, wherein at least a portion of the handle is disposed within the main housing when in the stowed position and the handle extends outward and away from the main housing when in the steering position, wherein the main housing further comprises a handle sensor configured to sense that the handle is at least one of in the stowed position or in the steering position;
a processor; and
a memory including computer program code configured to, when executed, cause the processor to:
receive one or more steering commands from the wired foot pedal;
cause the steering assembly to steer the trolling motor housing based on the one or more steering commands;
receive an indication to enter the local mode, wherein the indication to enter the local mode comprises an indication from the handle sensor that the handle is at least one of in the steering position or not in the stowed position; and
disable the steering assembly in response to receiving the indication to enter the local mode.

19. The trolling motor assembly of claim 18, wherein the handle is configured to rotate between the stowed position and the steering position about a second axis.

20. The trolling motor assembly of claim 18, wherein the handle is configured to telescope in and out of the main housing between the stowed position and the steering position.

* * * * *